United States Patent [19]
Nakamura

[11] 4,225,105
[45] Sep. 30, 1980

[54] TILT MOUNTING
[75] Inventor: Toyosaku Nakamura, Tokyo, Japan
[73] Assignee: Mitsuwa Photo Industry Co. Ltd., Tokyo, Japan
[21] Appl. No.: 956,100
[22] Filed: Oct. 31, 1978
[51] Int. Cl.² .......................................... F16M 11/10
[52] U.S. Cl. ..................................... 248/185; 403/61; 403/85
[58] Field of Search .................. 403/119, 120, 59, 61, 403/62, 80, 85, 92; 248/185, 183, 178, 122

[56] References Cited
U.S. PATENT DOCUMENTS

| 3,545,710 | 12/1970 | Mooney | 248/183 |
| 3,970,274 | 7/1976 | Resk | 248/185 |

Primary Examiner—Andrew V. Kundrat
Attorney, Agent, or Firm—George B. Oujevolk

[57] ABSTRACT

A tilt mounting having a base member, a pivoted frame, carried by the base member, a receptacle slidably held by the frame, a pair of support rods pivoted at their intermediate portions to said frame and supported at their ends by said base member and said receptacle so that the receptacle can slide back and forth in response to the pivoting of said frame, and means for fixing the receptacle at any desired angular position the tilt mounting can suitably be used for mounting a TV camera or the like on a tripod, and is capable of resetting the TV camera to the horizontal position due to the automatic shifting of the center of gravity to the supporting axis when the TV camera is left at any angle of elevation or when the TV camera is released from its fixing means.

8 Claims, 6 Drawing Figures

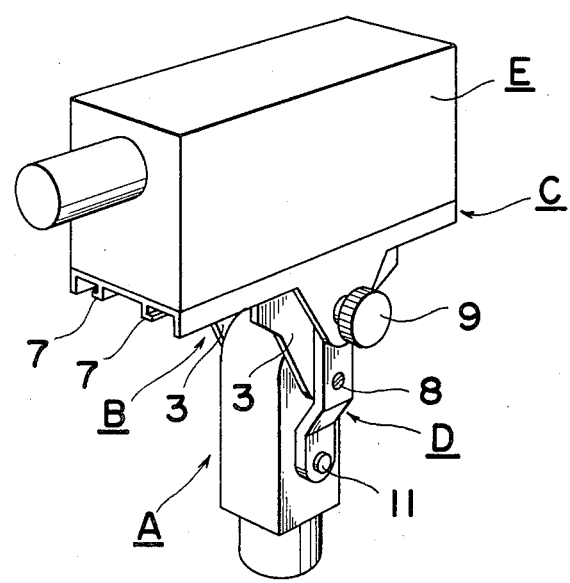
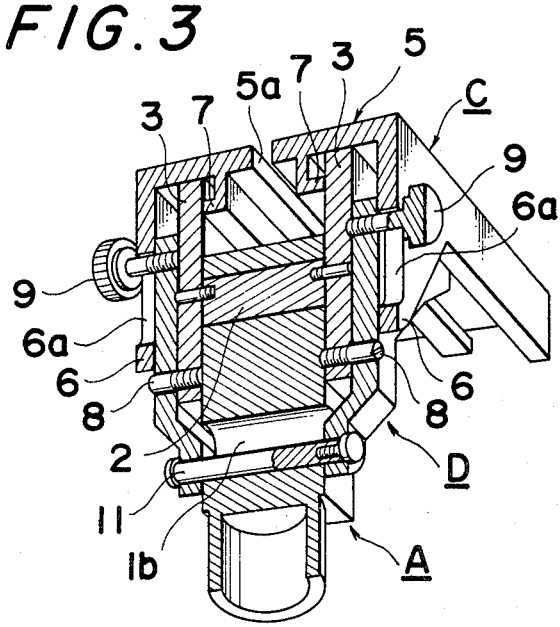

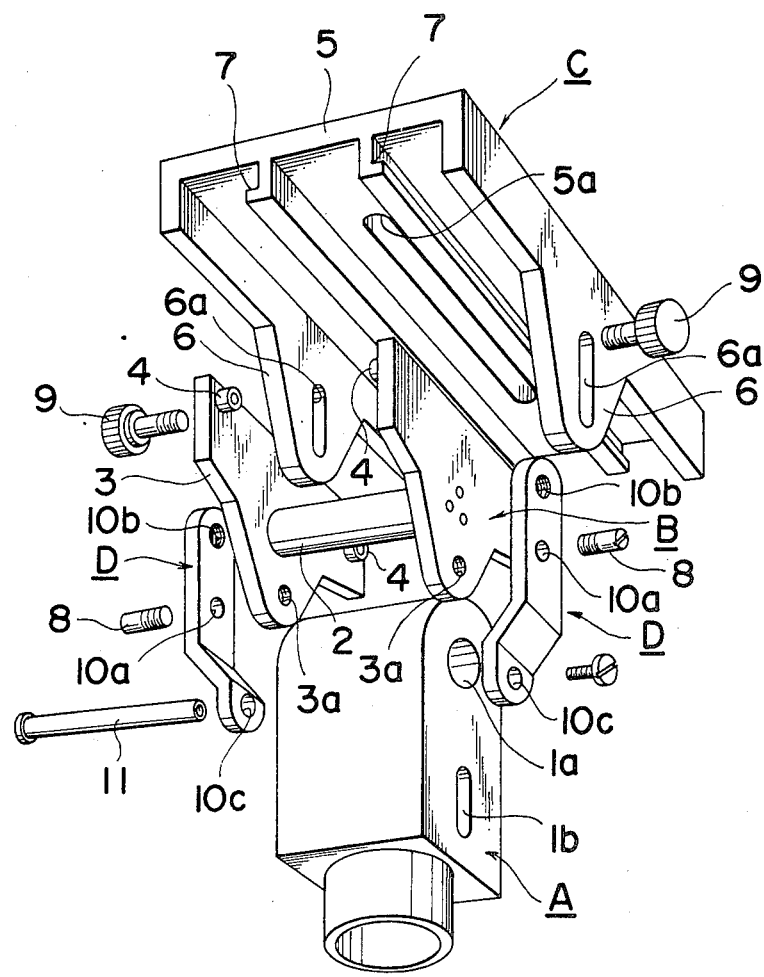

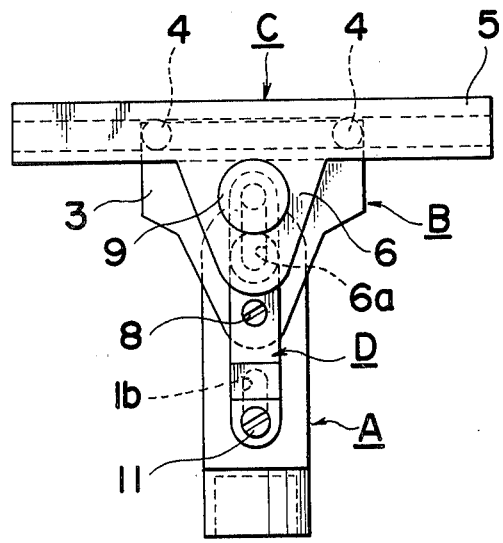
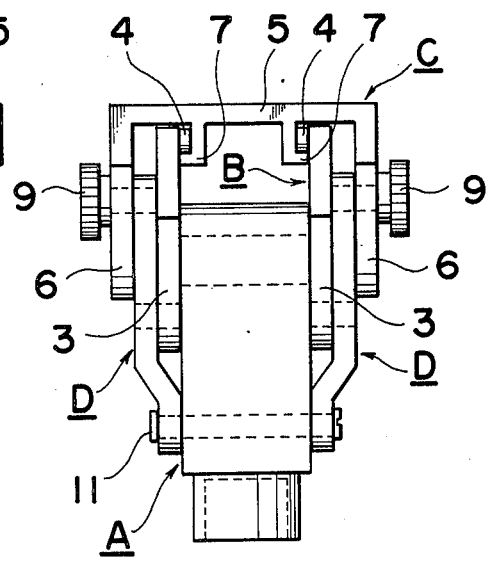
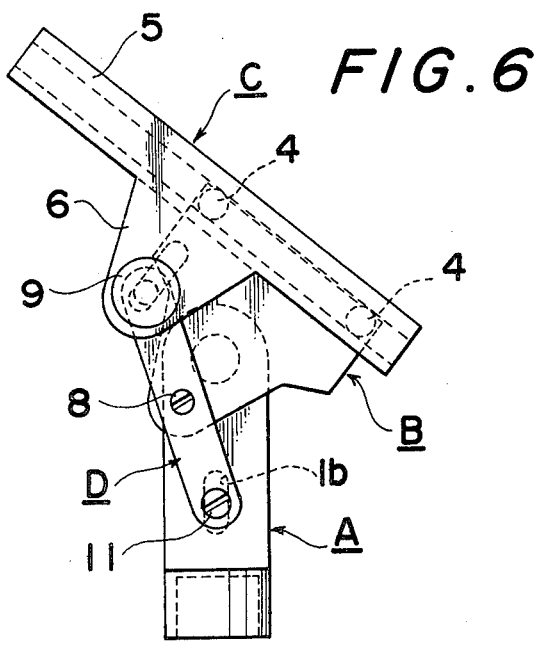

TILT MOUNTING

BACKGROUND OF THE INVENTION

The present invention relates to a tilt mounting which can be attached to the top of a tripod and adapted to carry various vertically and horizontally swingable instruments such as a TV camera, surveying instruments or the like, and is capable of fixing these instruments in place.

BRIEF DESCRIPTION OF THE PRIOR ART

Although various types of tilt mountings for the aforesaid purpose have been proposed, they suffer from common disadvantages. For instance, these conventional devices are so constructed that it is difficult to tighten the screw of the fixing means unless there is an assistant who assists the operator. At the same time, since these conventional mountings lack means for adjusting the balance of the weight or position of the mass of the instrument, it often happens that the instrument having a heavy weight, e.g., a TV camera suddenly inclines due to its weight and unbalanced mass and falls down together with the tripod and imparts considerable shock to the components of the device.

OBJECTS OF THE INVENTION

It is therefore a major object of the invention to provide a tilt mounting adapted to carry an instrument or device, e.g. a TV camera capable of automatically resetting the TV camera to a horizontal position when the operator happens to leave the instrument e.g., the TV camera directed at an object at an angle to the horizontal without fixing the TV camera, and thereby prevent the tripod from falling together with the TV camera.

The invention as well as other objects and advantages thereof will be more fully apparent from the following detailed description when taken together with the accompanying drawings, in which:

BRIEF DESCRIPTION OF THE DRAWINGS

FIG. 1 is a perspective view of a tilt mounting embodying the present invention carrying a TV camera;

FIG. 2 is an exploded perspective view of the tilt mounting shown in FIG. 1;

FIG. 3 is a perspective view of an essential part of the tilt mounting shown in FIG. 1;

FIG. 4 is a side elevational view of the universal joint shown in FIG. 1;

FIG. 5 is a front elevational view of FIG. 4; and,

FIG. 6 is a side elevational view of the tilt mounting shown in FIG. 1.

DETAILED DESCRIPTION

Shown in the drawings is a base member A supporting a pivoted frame B holding a receptacle C by supporting rods D and holding a TV camera E.

Base member A has an attaching bore aperture 1a formed at its upper end and is rotatably attachable to a tripod (not shown). Pivoted frame B has side plates 3 fixed to the ends of a support shaft 2 and rollers 4 attached to the ends of the side plates 3. The support shaft 2 is received by attaching bore aperture 1a so that the pivoted frame B as a whole is pivotally held by base member A. The receptacle C has a horizontal plate 5 and side plates 6 provided with elongated bore apertures 6a attached to both sides of horizontal plate 5, also, rails 7 having an L-shape cross-section provided on the lower surface of the horizontal plate 5. The rails 7 extend in parallel with the side plates 6, and are so engaged by rollers 4 that the receiptcle C as a whole is carried slidably in the longitudinal direction. Support rods D have bearing bores 10a, formed at their intermediate portions. The support rods D are pivotally mounted on screws 8 which are mounted on the threaded bores 3a of the support plates 3 through the bearing bores 10a. The support rods D have threaded bores 10b, formed at their upper ends. Fixing screws 9 are loosely received by the elongated bore apertures 6a formed in the side plates 6 of the receptacle C and are fastened into the threaded bores 10b. At the same time bearing bores 10c formed at the lower ends of support rod D receive a pin 11 which in turn is pivotally received by an elongated bore aperture 1b formed in the base member A.

When the receptacle C is held in a horizontal position as shown in FIG. 4, the center of gravity of the receptacle C is located on the axis of the support shaft 2 of the rotary frame B. The axis of the support shaft 2 coincides with the axes of the fixing screws 9, screws 8 and the support shaft 11, and these axes are on a common vertical line.

Therefore, when the TV camera is mounted on the receptacle C by means of the mounting groove 5a formed in the horizontal plate 5, such that the center of gravity of the TV camera is on the axis of the support shaft 2, the TV camera automatically maintains the horizontal position when the fixing screws 9 are not tightened.

When the front side end of the rear end of the TV camera is depressed downward, so as to place the TV camera at an angle to the horizontal, e.g., an angle of elevation, the receptacle C at first rotates around the axis of the support shaft 2, together with the pivoted frame B. At the same time, the support rods D are turned in the direction opposite to the turning of the rotary frame B, guided by the elongated apertures 1b formed in base member A and the elongated apertures 6a in the side plates 6 so as to push the receptacle C forward. Consequently, the receptacle C slides forward and, at the same time, is turned around the fixing screws 9 so that the TV camera can take any desired angle of elevation as shown in FIG. 6.

In this condition, the center of gravity of the TV camera E, therefore, is not concentrated on on one side as in the conventional tilt mounting so that the TV camera E can be handled easily with little effort and almost without feeling the weight of the TV camera.

The TV camera can be fixed at the correct angle of elevation as the fixing screws 9 are tightened. In this manner, since the weight is distributed evenly on both sides, in contrast to the conventional universal joint used in which the center of gravity is shifted to one side, the TV camera can be placed at the angle of elevation in a stable manner.

Other sliding means can be used instead of the rollers 4 for smoothening the sliding movement of the receptacle C, e.g., bearings.

When the fixing screws 9 are loosened, for changing the angle of elevation or for resetting the TV camera to the horizontal position after the completion of a shot, the pivoted frame B carrying the receptacle is allowed to turn. Since the center of gravity is slightly ahead of the axis of the support shaft 2, the pivoted frame B is turned together with the receptacle C because of the weight of the TV camera. The support rods D are then turned in the reverse direction guided by the elongated apertures 1b and 6a so as to reset the receptacle C to the original position, until the center of gravity of the TV camera comes again on the axis of the support shaft 2 of the rotary frame B. Consequently, the TV camera is automatically reset to and held in the horizontal position.

When using the tilt mounting, a so-called pendulum motion of the TV camera may take place if the resetting force is strong. However, this can be avoided by simply adjusting the tightening force of the fixing screws 9. Further, to avoid this pendulum motion, the tilt mounting of the invention may be provided with a suitable damper or a brake having resistance to suppress the oscillatory motion of the TV camera.

Though the invention has been described with specific reference to a TV camera held at an angle of elevation, it will be clear to those skilled in the art that the same advantages apply for any angle of the TV camera. In such a case, the inclined position of the TV camera is stabilized because the weight is evenly distributed to the front and rear. Thus, from any position, the TV camera is easy to handle and can be reset automatically to the horizontal position.

The TV camera is a very heavy instrument so that it is likely to fall together with the tripod when there is an unbalanced condition, or, if suddenly inclined can impart a strong shock to the components of the TV camera. For this reason, the invention has been described as being suitable for use in supporting a TV camera. However, the arrangement described is not restricted only to a TV camera. For instance, various instruments such as surveying instruments and the like can be advantageously carried by the arrangement described herein.

Furthermore, the means for shifting the receptacle C back and forth by the support rods D in response to the turning of the pivoted frame B may be elongated apertures formed at both side portions of the support rods D.

Having described a specific embodiment of the universal-type joint, it is believed that modifications and variations of the invention are possible in the light of the foregoing description.

What is claimed is:

1. A tilt mounting, comprising in combination:
   (a) a base member (A);
   (b) a pivoted frame (B), pivotally carried by said base member (A);
   (c) a receptacle (C) slidably held by said pivoted frame (B);
   (d) a pair of supporting rods (D) with ends and intermediate portions, pivoted at said intermediate portions to said pivoted frame (B) and supported at their respective ends by said base member (A) and by said receptacle (C), so that said receptacle slides back and forth in response to the turning of said pivoted frame; and,
   (e) fixing means for fixing said receptacle (C) at any desired angular position.

2. A device as claimed in claim 1 wherein said receptacle has side plates, sliding means between said receptacle and said frame for allowing the sliding movement of said receptacle on said frame including rails having an L-shape cross section formed in the lower surface of said receptacle and extending parallel to said side plates; and, a support plate coupled to said frame having side parts with rollers attached to said side parts, said rollers engaging said rails.

3. A device as claimed in claim 2 wherein said means for fixing said receptacle are screws for connecting said support rods to the side plates.

4. A device as claimed in claim 3 wherein the means for sliding said receptacle back and forth in response to the rotary frame comprises elongated apertures in said base member and said side plates, the rods (D) which are pivoted to said frame being connected at their ends to said elongated apertures.

5. A tilt mounting, comprising in combination:
   (a) a base member (A) with elongated apertures therein;
   (b) a tilt frame (B) with a pair of support plates provided with rollers, said tilt frame being swingably mounted on said base member (A), said support plates having a lower portion;
   (c) a tilt table (C) with rails having an L-shaped cross-section, said rails engaging with said rollers for allowing the sliding movement of said tilt table (C) on said tilt frame (B);
   (d) a support rod (D) pivotally mounted on said lower portion of said support plate, the mounting portion of said support rod (D) being movably mounted to said elongated apertures in said base member (A) and to said tilt table (C), and,
   (e) fixing means for fixing said tilt table (C) at any desired angular porition.

6. A tilt mounting as claimed in claim 5, wherein said base member (A) has an attaching bore aperture formed at its upper end, said frame (B) consisting of a support shaft pivotally supported by said attaching bore aperture, and said support plates being fixed to both sides of said support shaft for allowing the swing movement of said tilt frame (B).

7. A tilt mounting as claimed in claim 5 wherein the support rod (D) has two apertures pivotally connected with pins fixed to said base member (A) and said tilt frame (B).

8. A tilt mounting as claimed in claim 5 wherein said means for fixing said tilt table (C) are screws for connecting said support rods (D) to said tilt table (C).

* * * * *